United States Patent
Toney, Jr.

(10) Patent No.: US 9,077,462 B2
(45) Date of Patent: Jul. 7, 2015

(54) SYSTEMS AND METHODS FOR MEASURING AUDIENCE PARTICIPATION OVER A DISTRIBUTION NETWORK

(75) Inventor: Roy R. Toney, Jr., Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 747 days.

(21) Appl. No.: 12/974,304

(22) Filed: Dec. 21, 2010

(65) Prior Publication Data

US 2012/0159528 A1 Jun. 21, 2012

(51) Int. Cl.
| | |
|---|---|
| *H04H 60/32* | (2008.01) |
| *H04N 7/10* | (2006.01) |
| *H04H 60/33* | (2008.01) |
| *H04N 21/442* | (2011.01) |
| *H04H 20/91* | (2008.01) |

(52) U.S. Cl.
CPC ......... *H04H 60/33* (2013.01); *H04N 21/44204* (2013.01); *H04N 21/44213* (2013.01); *H04N 21/442* (2013.01); *H04H 20/91* (2013.01)

(58) Field of Classification Search
USPC ..................................... 725/14, 34
See application file for complete search history.

(56) References Cited

U.S. PATENT DOCUMENTS

| | | | |
|---|---|---|---|
| 6,061,082 A | 5/2000 | Park | |
| 8,108,895 B2* | 1/2012 | Anderson et al. | 725/36 |
| 2002/0080161 A1 | 6/2002 | St. Maurice et al. | |
| 2002/0087969 A1 | 7/2002 | Brunheroto et al. | |
| 2003/0014746 A1* | 1/2003 | Giroux | 725/14 |
| 2003/0051238 A1 | 3/2003 | Barone, Jr. | |
| 2006/0130120 A1 | 6/2006 | Brandyberry et al. | |
| 2006/0212895 A1* | 9/2006 | Johnson | 725/12 |
| 2007/0061724 A1 | 3/2007 | Slothouber et al. | |
| 2007/0276926 A1 | 11/2007 | LaJoie et al. | |
| 2008/0036757 A1* | 2/2008 | Furukawa et al. | 345/418 |
| 2008/0091512 A1* | 4/2008 | Marci et al. | 705/10 |
| 2009/0018898 A1 | 1/2009 | Genen | |
| 2009/0089838 A1 | 4/2009 | Pino, Jr. et al. | |
| 2009/0240677 A1* | 9/2009 | Parekh et al. | 707/5 |
| 2009/0317053 A1 | 12/2009 | Morley et al. | |
| 2010/0060802 A1 | 3/2010 | Huegel | |
| 2010/0070987 A1* | 3/2010 | Amento et al. | 725/10 |
| 2010/0125869 A1 | 5/2010 | Beyabani | |
| 2010/0161506 A1* | 6/2010 | Bosenick et al. | 705/347 |
| 2010/0162343 A1 | 6/2010 | Roberts et al. | |
| 2011/0067046 A1* | 3/2011 | Cox et al. | 725/14 |
| 2011/0110515 A1* | 5/2011 | Tidwell et al. | 380/200 |

(Continued)

*Primary Examiner* — Pankaj Kumar
*Assistant Examiner* — Franklin Andramuno
(74) *Attorney, Agent, or Firm* — Sutherland Asbill & Brennan LLP

(57) ABSTRACT

Embodiments of the invention include systems and methods for measuring audience participation over a distribution network. An example method may include delivering media content to a viewer's CPE over a distribution network and delivering an audience measurement application associated with the media content over the distribution network. The audience measurement application can be configured for execution by the viewer's CPE, and can be programmed to generate at least one inquiry for display to the viewer in association with viewing the media content and to request at least one response by the viewer to be entered via the viewer's CPE. The method may further include receiving response information associated with the response to the inquiry from the viewer's CPE over the distribution network, and determining the viewer's participation level associated with the media content based at least in part on the response information received from the viewer's CPE.

19 Claims, 7 Drawing Sheets

(56) References Cited

U.S. PATENT DOCUMENTS

| | | | |
|---|---|---|---|
| 2011/0213837 A1* | 9/2011 | Beebe | 709/204 |
| 2012/0023521 A1* | 1/2012 | Lordan et al. | 725/35 |
| 2012/0072946 A1* | 3/2012 | Cranman et al. | 725/28 |
| 2012/0093481 A1* | 4/2012 | McDowell et al. | 386/241 |

* cited by examiner

SYSTEMS AND METHODS FOR MEASURING AUDIENCE PARTICIPATION OVER A DISTRIBUTION NETWORK

FIELD OF THE INVENTION

Aspects of the invention relate generally to distribution networks, and more particularly, to systems and methods for measuring audience participation over a distribution network.

BACKGROUND OF THE INVENTION

Audience measurement systems are utilized in an attempt to measure audience viewership of television programming. Such information is utilized by programming networks as well as content providers to assess relative levels of programming success as well as viewing habits related to popular television time slots. However, existing technology is quite limited, requiring home set meters connected to a household's television set and communicating with a rating agency (e.g., Nielsen Media Research, etc.) over a telephone line for subsequent analysis. These home set meters incur additional hardware cost and, thus, are provided to an extremely limited number of households. The research at the time of this filing indicates that far fewer than 0.1 percent of households in the United States with televisions are monitored with these conventional home set meters. Moreover, the home set meters do not provide a means to gather viewer experience or opinion regarding the viewed programming, but instead simply report which channels have been tuned to and the corresponding time tuned.

Accordingly, there exists a need to more effectively measure audience participation.

BRIEF DESCRIPTION OF THE INVENTION

Some or all of the above needs and/or problems may be addressed by certain embodiments of the invention. According to one embodiment, a method for measuring audience participation is provided. The method may include delivering media content to a viewer's consumer premise equipment ("CPE") over a distribution network, and delivering an audience measurement application associated with the media content over the distribution network. The audience measurement application can be configured for execution by the viewer's CPE, and can be programmed to generate at least one inquiry for display to the viewer in association with viewing the media content and to request at least one response from the viewer to be entered via the viewer's CPE. The method may further include receiving response information associated with the inquiry from the viewer's CPE over the distribution network, and determining the viewer's participation level associated with the media content based at least in part on the response information received from the viewer's CPE.

According to another embodiment, a computer-readable medium is provided, having computer program instructions stored thereon, which provide an audience measurement application for delivery over a distribution network to a CPE. The audience measurement application, when executed by the CPE, causes the CPE to: display to a viewer at least one inquiry after a predetermined amount of the media content has been displayed by the CPE; receive at least one response to the inquiry; and transmit information associated with the response from the CPE over the distribution network to a network operator system. The response information can enable evaluation by the network operator system to determine the viewer's participation level associated with the media content.

According to yet another embodiment, a system for measuring audience participation is provided. The system may include a network operator system in communication with a distribution network. The network operator system may be operable to: deliver media content to a viewer's CPE over the distribution network, and deliver an audience measurement application associated with the media content over the distribution network. The audience measurement application may be configured for execution by the viewer's CPE, and to generate at least one inquiry for display to the viewer in association with viewing the media content and to request at least one response from the viewer to be entered via the viewer's CPE. The network operator system may be further operable to: receive response information associated with the response from the viewer's CPE over the distribution network, and determine the viewer's participation level associated with the media content based at least in part on the response information received from the viewer's CPE.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
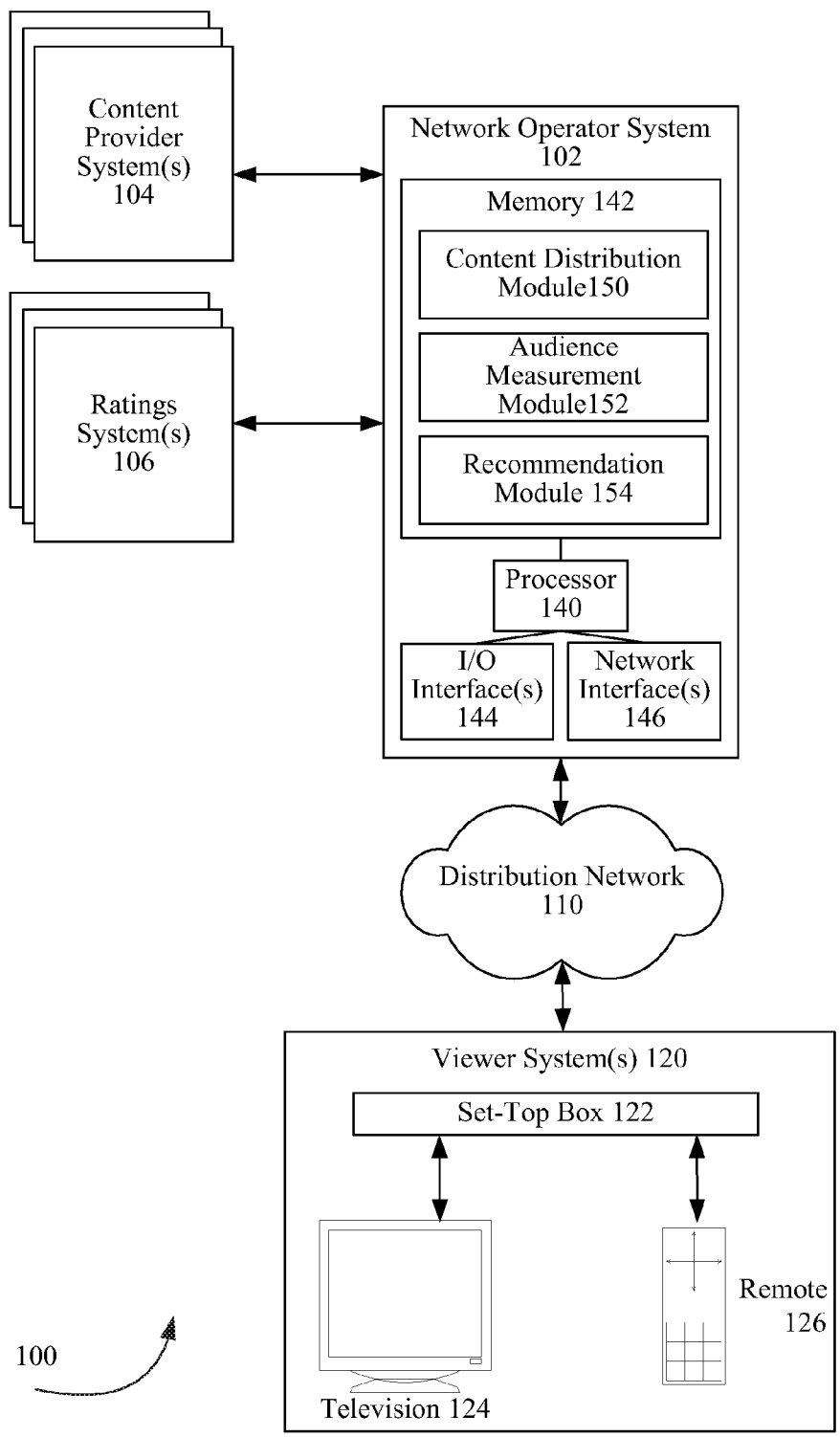
FIG. 1 is a block diagram depicting an example system, according to an example embodiment.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments described herein include systems and methods for measuring audience participation and viewership over a content distribution network, such as over a cable broadcast network, a satellite broadcast network, or an IP network. Current interactive television technology (also referred to as "iTV," "ITV," and "Enhanced TV") allows an interactive viewing experience beyond traditional passive television viewing. For instance, interactive television allows linking or otherwise associating software application programming to media content, which can be delivered over the distribution network for execution directly on consumer premise equipment ("CPE") at the viewer's location, such as by a set-top box. As one example, interactive television applications can be programmed according to the Enhanced TV Binary Interchange Format ("EBIF"), developed by Cable Television Laboratories, Inc. of Louisville, Colo. One familiar example of interactive television applications includes interactive programming guide applications and advanced video on-demand ordering systems. Accordingly, interactive television applications allow more advanced and expansive delivery of media content as well as direct and sophisticated interaction with the viewer, such as capturing viewer responses and input while viewing the media content. As used herein, the term "media content" is used to refer generally to television programming or other content distributable to a viewer over a distribution network.

Therefore, interactive television applications can be provided that are delivered with media content and programmed to collect viewers' responses or otherwise determine viewership of the media content, according to one embodiment. For example, when delivering media content to a viewer's CPE over a distribution network, an audience measurement interactive television application (herein referred to as an "audience measurement application" or "AMA") that is associated with the same media content is also delivered over the distribution network. The AMA may be transmitted in-band with the media content or out-of-band separate from the media content. The AMA may be configured in a number of ways to detect viewer participation. For example, in one embodiment, the AMA may cause the display of one or more inquiries while displaying the media content. If the viewer responds to the inquiry, then the AMA transmits the viewer's response and/or an indication that the viewer responded over the distribution network for tracking and analysis to determine viewer participation levels as they relate to the respective media content. As used herein, the term "participation level" and any variation thereof refers generally to any measurement associated with viewing media content, such as, but not limited to, length of time viewing the content, relative number or measurement of viewers of the content, ratings associated with the content, and the like.

It may be desirable to only categorize a viewer as having "viewed" content if the viewer has tuned to the content for at least a minimum amount of time or viewed a portion of the overall content. Otherwise, viewers who are switching channels or only briefly viewing the media content would be improperly logged as having viewed the content when, in fact, they viewed very little of the content and likely would not be statistically relevant for determining viewership measurement metrics. Thus, in one embodiment, the AMA may be programmed to generate one or more inquiries at a predetermined segment of the media content, such as after the media content has been viewed for at least a minimum amount of time. For example, a timer function may be provided by the AMA to track how much of the media content has been displayed, which may optionally also account for intermediate portions of the media content that were not displayed (e.g., by switching channels and switching back, etc.). In another embodiment, the AMA can be transmitted at some earlier segment in the media content whereby the amount of programming between the earlier segment and the later segment when the inquiry or inquiries are displayed would be at least the same or greater than the desired minimum amount of content to classify the viewer as having "viewed" the content.

Likewise, the AMA may be programmed to request feedback or rating information from the viewer, according to one embodiment. For example, at least one of the inquiries generated at a predetermined segment of the media content may include a request for feedback. Various types of feedback may be collected from the viewer, such as, but not limited to: like or don't like indications; number of star ratings; thumbs up or thumbs down ratings; numerical scale ratings; and the like. The feedback data can be transmitted by the AMA upstream over the distribution network to the network operator, allowing analysis of the feedback and optionally compiling the feedback from multiple viewers to generate more useful audience participation metrics based on the subjective opinions of the viewers.

Accordingly, using interactive television functionality provides a simple, efficient manner to collect viewer measurement data over a distribution network. No additional hardware is required, and the viewers need not be acutely aware that their habits are being tracked, which has been alleged to cause bias and alter viewing habits when using conventional ratings techniques. Moreover, the interactive television technology allows collecting additional data other than simply when and what channels have been watched. According to various embodiments, an AMA may be programmed to capture viewing time, to capture channel change information, and to capture media content information (e.g., from a programming guide data), in addition to the user's own subjective feedback in response to the inquiries.

More details regarding the various means for implementing the embodiments of the invention are provided below with reference to FIGS. 1-4.

System Overview

An example system 100 will now be described illustratively with respect to FIG. 1. The system 100 may include one or more network operators and associated network operator systems 102, one or more content providers and associated content provider systems 104, one or more rating entities and associated ratings systems 106, and one or more distribution networks 110. In addition, the system 100 includes one or more viewer systems 120, which may be collectively referred to as consumer premise equipment or CPE, in communication with a network operator system 102 via the distribution network 110. Each of the aforementioned systems or system components is configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

The network operator system 102 illustrated in FIG. 1 represents any system or systems comprising one or more computers or other processor-based devices for implementing various functions provided by the respective network operator. It is appreciated that a network operator system 102 may represent a multiple-system operator ("MSO"), or other distribution network operator, and may logically include operations performed in part by the network plant, the head-end, and/or any other component or device of a conventional network operator system. Accordingly, the network operator system 102 may include one or more processor-driven devices, such as, but not limited to, a server computer, a personal computer, a mobile computing device, and the like. In addition to having one or more processors 140, the network operator system 102 may also further include one or more memories 142, one or more input/output ("I/O") interfaces 144, and one or more network interfaces 146. The memory 142 may store data files and various program modules, such as an operating system ("OS"), a client and/or host module, and a database management system ("DBMS") for accessing one or more databases. Various databases may be operative for storing media content information, viewer profiles, viewer response information, viewer measurement metrics data, recommendation engine data, and/or other information accessible by the network operator system 102 and utilized to broadcast media content and facilitate measuring viewer participation, as well as implementing the operations described herein. The I/O interfaces 144 may facilitate communication between the processor 140 and various I/O devices, such as a keyboard, mouse, printer, microphone, speaker, monitor, and the like. The network interfaces 146 may take any of a number of forms, such as, but not limited to, a network interface card, a modem, a wireless network card, and the like. In one embodiment, the network interfaces 146 may include network system hardware, software, and/or firmware operable to provide content and other data transmission through the distribution network 110, such as over an in-band or an out-of-band media channel with one or more viewer devices 120 (e.g., a set-top box 122 and/or a television 124), and/or receive viewer response information and associated data over the distribution network 110. In some embodiments, it is possible for viewer devices 120 to transmit data to the network operator system 102 over a different network, such as the Internet or any other public or private communications network.

The network operator system 102 may include a content distribution module 150, an audience measurement module 152, and a recommendation module 154. The content distribution module 150, audience measurement module 152, and recommendation module 154 are represented in FIG. 1 as separate modules or components; however, it is appreciated that these components may represent logical functions implemented by a single physical device or may be provided, at least in part, by one or more separate physical devices.

The content distribution module 150 may include computer-executable instructions providing programming logic to distribute media content (e.g., linear broadcast programming and/or non-linear/on-demand programming) received from one or more content provider systems 104 and distributed over the distribution network 110 to a viewer system 120 (e.g., to a set-top box 122, etc.), which may be responsive to a viewer's selection or other request therefor (e.g., selection of a channel or request for a particular non-linear asset). The content distribution module 150 may also be operable to include and distribute one or more AMAs for execution on a viewer's CPE. The AMAs may be delivered in-band with the media content or over an out-of-band channel separate from the media content with which they are associated. For example, one aspect of an AMA may be to include an overlay (or otherwise insert into the content stream) providing the one or more inquiries for display to the viewer regarding whether they completed a program or requesting their subjective feedback regarding the program. It is appreciated that the content distribution module 150, and/or another component of the network operator system 102, may be operable to perform other conventional media content distribution functions not specifically described herein. Moreover, the content distribution module 150 and the network operator system 102 may be configured for distributing media over other distribution networks 110 other than cable networks, such as, but not limited to, a satellite broadcast network or an IP network, according to various example embodiments.

The audience measurement module 152 may likewise include computer-executable instructions providing programming logic to facilitate the generation of AMAs to capture viewer participation information and the association of AMAs with respective programs for delivery to the viewer systems 120 over the distribution network 110. In addition, the audience measurement module 152 may further include programming logic to receive and process viewers' response information to AMA inquiries. As part of processing the response information, the audience measurement module 152 may compile all response information from each viewer in order to generate a viewer profile with preferences and habits, that may be useful in generating media content recommendations. The audience measurement module 152 may also compile and analyze response information from multiple viewers for each media content program, allowing the network operator system 102 to generate cumulative audience measurement metrics for individual programming based upon the responses generated as a result of the AMA programming. The audience measurement module 152 may thus also facilitate transmitting audience measurement metrics data to one or more third-party systems, such as to one or more content provider systems 104 and/or one or more ratings systems 106.

The recommendation module 154 may likewise include computer-executable instructions providing programming logic to facilitate analyzing AMA response information from viewers and to generate one or more media content recommendations for viewers, based on viewing habits and/or subject to viewer feedback gathered by the AMAs. It is appreciated that the recommendation module 154 may be programmed according to any number of conventional recommendation engine technologies and/or recommendation logic suitable to analyze viewed content and to identify similar or otherwise recommended media content based on viewers' habits. In some embodiments, the recommendation module 154 may communicate with other recommendation engine services, providing input regarding viewers' viewing habits and receiving recommendation responses, such as if hosted by a third-party recommendation engine.

It is appreciated that the network operator system 102 may be further configured to perform additional operations not described in detail herein, such as those operations typically performed to distribute linear content and/or non-linear content over a distribution network 110, which shall not impact the scope of the embodiments described herein.

The content provider systems 104 represent any system or systems comprising one or more computers or other processor-based devices for implementing various functions provided by or on behalf of content providers. Content providers may include any entity that delivers linear or non-linear media content over the distribution network 110 by the network operator system 102. Content providers can include, but are not limited to, production studios, national media networks, local media networks, and the like. It is appreciated, however, that other types of content providers (e.g., music providers, software providers, e-book providers, etc.) may also be included. Accordingly, a content provider system 104 is operable to provide content to the network operator system 102 for delivery to viewers. The content provider systems 104 may be in communication with the network operator system 102 via any communications network, such as, but not limited to, a private wired or wireless network or a public wired or wireless network (e.g., the Internet, etc.).

The ratings systems 106 represent any system or systems comprising one or more computers or other processor-based devices for implementing various functions provided by or on behalf of ratings entities (e.g., The Nielsen Company of New York, N.Y., etc.). Ratings entities may include any entity that analyzes and/or provides viewership information, such as show ratings, popularity metrics, viewing habits, and the like. It is appreciated that the network operator system 102 is not required to integrate with or otherwise communicate with a ratings system 106, and, thus, may not receive or transmit information therebetween in some embodiments.

With reference to the viewer system 120, one or more CPEs or viewer devices may optionally be provided, such as, but not limited to, a set-top box 122, a television 124 (or other display, such as a personal computer and monitor in an IP network, or a projector and screen, etc.), and/or a remote control device 126. As used herein, the terms "CPE" and "viewer device" refer generally to any one or a combination of set-top boxes 122, televisions 124, other displays, or any other devices operable and configured to present linear and/or non-linear (e.g., on-demand) media content to a viewer. In addition, as further described herein, some CPEs may be operable to receive and facilitate the execution of one or more interactive television software application modules that are transmitted over a distribution network, such as one or more AMAs transmitted in-band or out-of-band in association with specific media content as described in more detail herein, or any other executable application. Typically, a set-top box 122, a television 124 (or other device, such as a media gateway, a personal computer, etc.) can be operable for executing interactive television software applications.

A set-top box 122 may be any suitable device configured to connect to a television 124 or other display and an external source of a signal over a distribution network 110. For example, the set-top box 122 may be a cable set-top box, a cable card, a gateway device, a combination modem and set-top device, a digital satellite set-top box, or an Internet protocol television ("IPTV") set-top box operatively configured to communicate with a corresponding network operator system 102 (e.g., a cable network operator, a satellite network operator, an over-the-top IP network content distributor/operator, etc.) over a corresponding distribution network 110 and to convert the received signals into signals capable of displaying audio/video content by a television 124 or other display to a viewer. In one embodiment, the set-top box 122 is adapted to connect to and communicate with a television 124 or other display, as well as to receive command signals from one or more remote control devices 126, which may be a conventional remote control device or any other user device programmed and operable for communicating directly or via an intervening device with the set-top box 122, such as wirelessly (e.g., infrared, Bluetooth, radio frequency, etc.). A remote control device 126 may be utilized by a viewer to respond to inquiries and provide subjective feedback in association with viewed media content and associated AMAs.

The set-top box 122 may be a multipurpose computing device having one or more processors, memories, and input/output ("I/O") interfaces. The set-top box 122 may also include a video processor for processing and providing digital and analog audio/video signaling to a television 124 or other viewer devices, an operating system, and a tuner operable for processing audio/video and/or data from the network operator system 102. The set-top box 122 may pass digital and analog audio/video content and/or data to a television 124 that is received from the distribution network 110 via an audio/video and/or data downlink (e.g., an in-band downlink, or an out-of-band downlink, respectively). The set-top box 122 may include computer-executable instructions that provide programming to facilitate the display of content, instructions, and special features; to facilitate the receiving and processing of viewer commands issued via a remote control device 126, for example; and to transmit or otherwise communicate with the network operator system 102 over the distribution network 110 (or any other communications network) to process commands and requests. In one embodiment, the set-top box 122 (or other viewer device) is configured with user agent programming instructions operable to execute interactive television applications (e.g., executing EBIF applications, etc.) that are associated with the media content stream (in-band or out-of-band) and selected by a remote control device 126, which, in some instances, causes one or more responses, feedback, commands, or other information related thereto, to be transmitted upstream to the network operator system 102. Example interactive television software programming includes, but is not limited to, AMA features as described in more detail herein, such as generating and causing to be displayed one or more inquiries in association with media content being displayed, timing the display of the one or more inquiries, implementing a timer functionality to track viewing duration, receiving viewer responses, receiving viewer feedback, gathering additional information stored locally within the CPE, displaying and/or allowing selection of recommended media content, any of which may be for transmission to the network operator system 102 via the distribution network 110 (e.g., via an up-link).

In other embodiments, a set-top box 122 may not be provided, such as where another viewer device is used (e.g., a television 124 adapted for direct communication with a distribution network 110, or a personal computer and display adapted for communication over a distribution network 110, such as an IP network, any of which may be operable to execute interactive television applications). It is appreciated that the aforementioned examples of viewer devices and network adaptability are provided for illustrative purposes only, and that any other distribution network viewer device may be used with the system 100.

The distribution network 110 may include any number of telecommunication and/or data networks, whether public, private, or a combination thereof, including one or more conventional broadband distribution networks, such as a fiber optic network, a telephone network, an existing cable television broadcast network (e.g., fiber network, coaxial network, hybrid fiber-coaxial network, etc.), a satellite broadcast network, an IP network, and the like, which are operable to support transmission according to various media content and transmission protocols (e.g., MPEG 2, ISO 13818-1, etc.). The distribution network 110 may support downstream, upstream, and/or bi-directional communications. Due to network connectivity, various methodologies described herein may be practiced in the context of distributed computing environments. Although the system 100 is shown for simplicity as including one intervening distribution network 110, it is to be understood that any other network configuration is possible, which may optionally include a plurality of networks, each with devices, such as gateways and routers, for providing connectivity between or among networks.

Although not described or illustrated in detail, each content provider system 104 and each ratings system 106 may be configured in the same or similar manner as described for the network operator system 102. In addition, the system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Operational Overview

Figure 2:
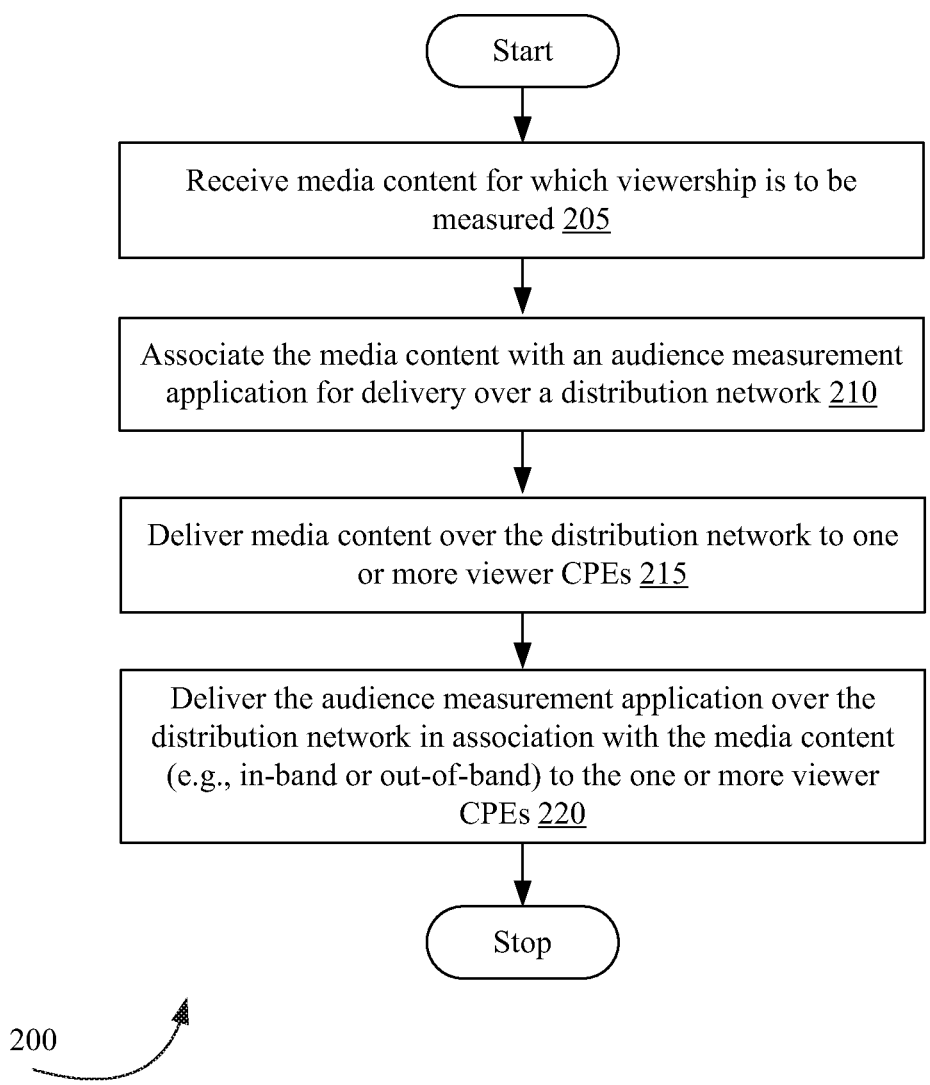
FIG. 2 is a flow diagram depicting an example method for delivering media content and an audience measurement application over a distribution network, according to an example embodiment.

FIG. 2 is a flow diagram depicting an example method for delivering media content and an audience measurement application over a distribution network, according to an example embodiment. In one embodiment, the method 200 is performed by a network operator system 102, such as by a content distribution module 150 and/or an audience measurement module 152, as described with reference to FIG. 1. The method 200 may begin at block 205, in which the network operator system 102 receives media content for delivery to its customer viewers. According to the embodiments described herein, the viewership and audience participation for the media content are to be measured. As used herein, the term "media content" generally refers to a single asset or program (e.g., a television show, a movie, or other programming segment, etc., which may be linear or non-linear programming) unless otherwise explicitly stated, such that audience participation for individual programming can be measured by these systems and methods. According to some embodiments, the media content may be provided to the network operator system 102 from one or more content provider systems 104 for preparation and distribution over the distribution network 110 to viewers' CPEs.

Following block 205 is block 210, in which the media content received at block 205 is associated with one or more AMAs for execution by a viewer's CPE when viewing the media content to facilitate measuring viewer participation. As described herein, an AMA may be an interactive television application, such as an EBIF application, for execution on the viewer's CPE device and to receive viewer responses and/or feedback data for reporting back to the network operator system 102. In one embodiment, a one-to-one association can be provided between each media content program and an AMA, such that a unique AMA is provided for each distinct media content (e.g., unique interactive television programming). This will allow the AMA to be programmed to uniquely identify the media content (e.g., including a unique identifier, a channel and time slot, a media content name, etc.) in the response information transmitted back to the network operator system without needing to capture any additional information at the viewer's CPE to identify the media content. For example, the audience measurement module 152 may generate and store an association with an AMA for any media content for which viewer participation is to be measured. Upon delivering media content, the respective AMA can thus be transmitted (e.g., in-band or out-of-band) with the media content based on the stored association. In other embodiments, however, an AMA may be generally applicable to any number of individual media content programs, and media content identifying information may be gathered at the viewer's CPE (e.g., from programming guide data, etc.) and/or at the network operator system (e.g., based on guide data, a channel and time slot combination, corresponding tuning requests from the viewer's set-top-box, etc.). Thus, when media content is to be measured for viewer participation, a generally configured AMA can be delivered without an explicit association therebetween.

Following block 210 are blocks 215 and 220, in which the media content and an AMA are delivered to a viewer's CPE over the distribution network 110, such as in response to the viewer tuning to a particular channel or requesting a particular non-linear asset via a set-top box 122. In one embodiment, the AMA may be transmitted in-band and bounded to the media content being delivered over the distribution network 110. In another embodiment, the AMA may be transmitted over an out-of-band channel over the distribution network 110 for subsequent association with the media content. The media content segment with which the AMA is associated or transmitted may vary, according to different embodiments, as further described herein, such as with reference to FIGS. 4-5.

For example, in one embodiment, the AMA is transmitted and/or associated with a predetermined segment of the media content (e.g., at or near the approximate half-way point of the media content, etc.). Thus, by transmitting the AMA with at least half of the media content remaining, and by generating one or more viewer inquiries for display at or near the end of the media content programming, it can be concluded that the viewer began viewing the media content at some point between the beginning and half-way point and viewed at least the entire second half of the programming. In this manner, the network operator system may make a determination that at least a minimum amount of the media content (e.g., at least one-half, etc.) was viewed and can measure audience participation accordingly. It is appreciated that, according to various other embodiments, the AMA may deliver the predetermined segment of the media content at any desired segment within the programming.

As another example, an AMA may be transmitted when the media content is initially requested, and a timer function is executed that tracks the time duration during which the media content is displayed. Thus, the total time viewed can be transmitted back to the network operator system 102 to be utilized to determine whether at least a minimum amount of the media content was viewed to measure audience participation and/or to track actual time/amount of media content viewed, and need not be constrained to the half-way point of the media content.

The method 200 may end after block 220, having delivered both the media content and an AMA to a viewer's CPE to allow tracking the viewer's participation level with respect to the media content.

Figure 3:
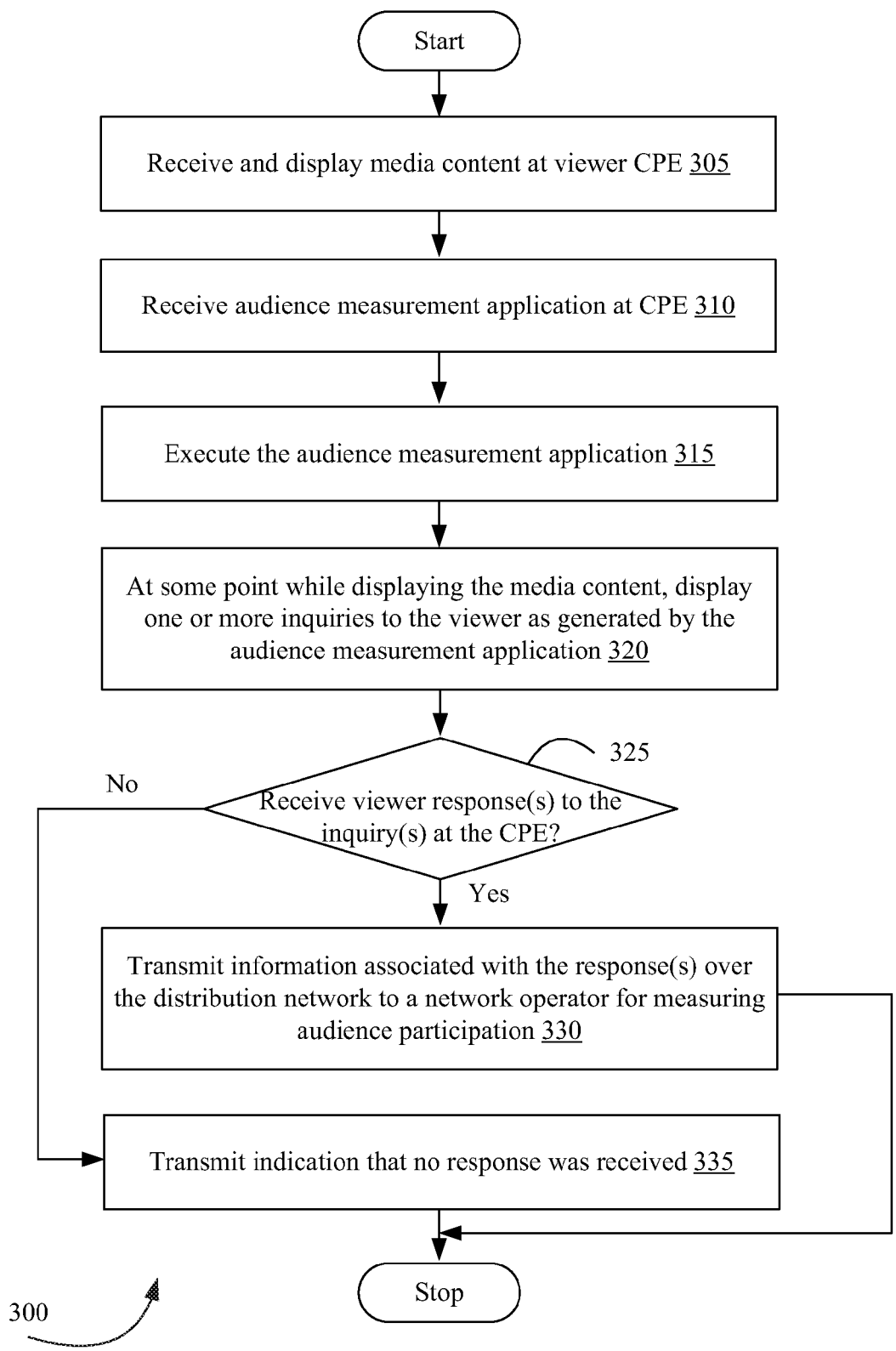
FIG. 3 is a flow diagram depicting an example method for collecting audience participation information by consumer premise equipment, according to an example embodiment.

FIG. 3 is a flow diagram depicting an example method for collecting audience participation information by a viewer's CPE in response to the media content and AMA delivered by the previously described method 200, according to an example embodiment. In one embodiment, the method 300 is performed by a viewer's CPE operable to execute interactive television applications (e.g., EBIF applications), which may include, but are not limited to, a viewer's set-top box 122 or a television 124 configured with a user agent operable to execute interactive television applications (e.g., executing the EBIF applications, etc.), as described with reference to FIG. 1.

The method 300 may begin at block 305, in which the viewer's CPE receives the media content, which is delivered according to the method 200 described with reference to FIG. 2, over a distribution network 110 for display (e.g., display on the viewer's television 124, etc.). Likewise, at block 310, the viewer's CPE receives the AMA associated with the media content to facilitate capturing viewer responses and feedback in association with viewing the media content, which is also delivered according to the method 200. As described in more detail herein, such as with reference to FIGS. 4-5, the timing of receiving the AMA may differ according to various embodiments, such as when initially tuning to a program or at a predetermined intermediate segment of the media content program.

Following block 310 is block 315, in which the AMA is executed by the viewer's CPE. Execution of the AMA may likewise differ according to different embodiments, although the general operability of the AMA is to cause display one or more inquiries while the viewer is tuned to the media content to determine whether the viewer is in fact viewing at that point, as shown at block 320. Generally, the AMAs can be programmed to display the one or more inquiries only after a predetermined period of time to indicate that the viewer had been viewing the media content for at least a minimum threshold amount of time. Otherwise, the network operator system 102 may not wish to log the viewer as having viewed the media content if he/she has not viewed the content for a material amount of time. Such programming avoids collecting participation data (or otherwise indicating a viewer as having viewed the content) for viewers who only quickly tuned to the channel.

Figure 4:
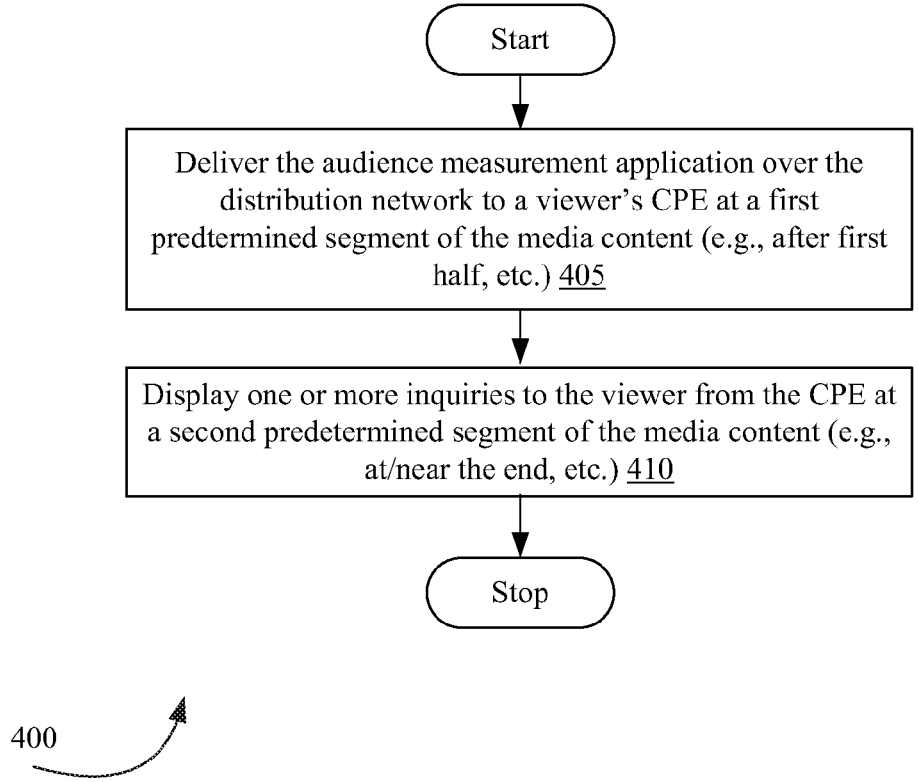
FIG. 4 is a flow diagram depicting an example method for executing an audience measurement application by a consumer premise equipment device, according to an example embodiment.
Figure 5:
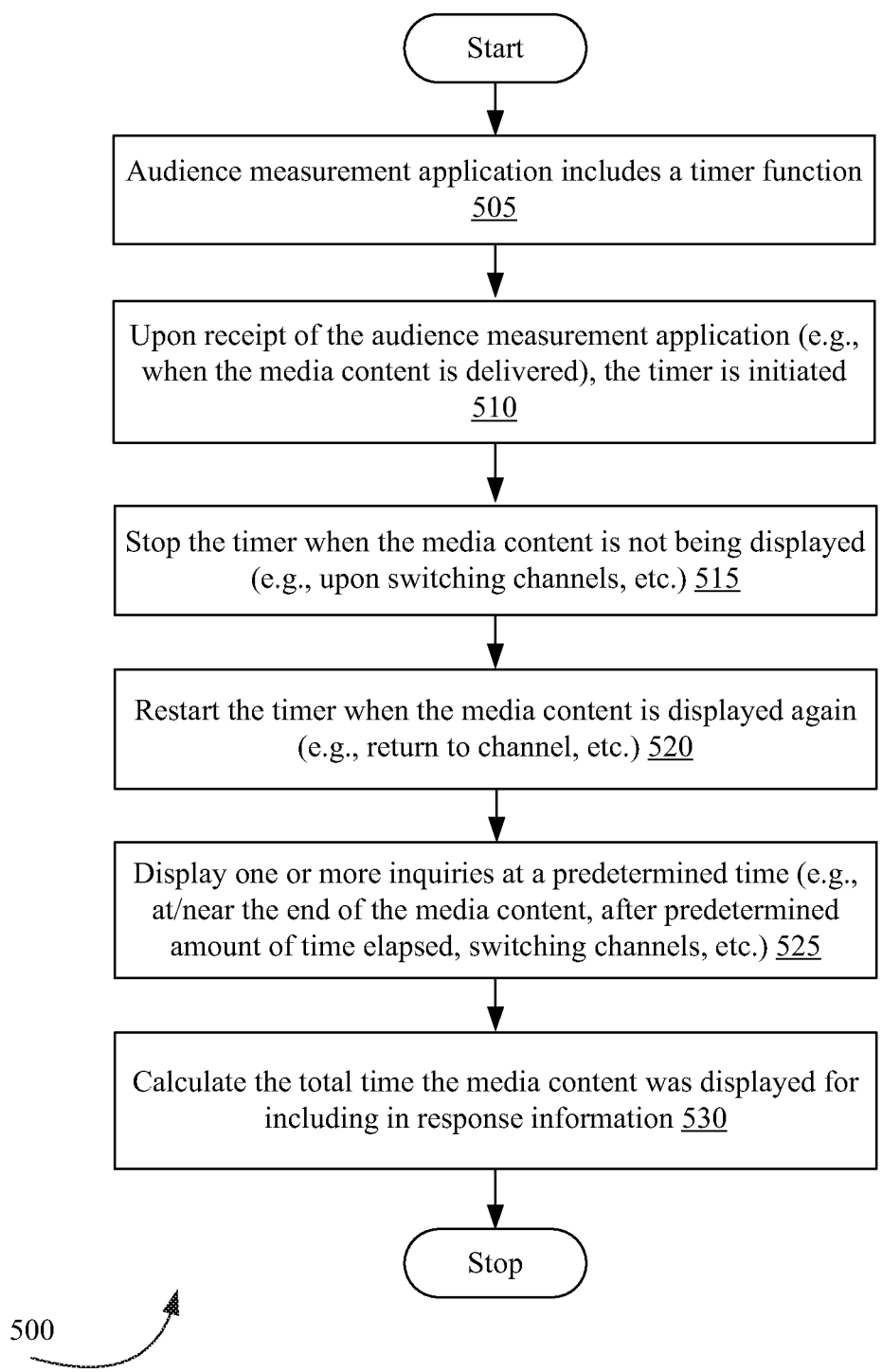
FIG. 5 is a flow diagram depicting an example method for executing an audience measurement application by a consumer premise equipment device, according to an example embodiment.

FIGS. 4-5 provide example AMA programming methods for timing the display of the one or more inquiries to allow identification of only those viewers who tuned to the media content for at least a minimum amount of the program. FIG. 4 is the flow diagram that depicts an example method by which an AMA is transmitted at a first predetermined segment of the corresponding media content and the displays one or more inquiries at a later predetermined segment, which is later than the first predetermined segment by at least a minimum amount of time to classify the viewer as having viewed the media content. The method 400 may thus begin at block 405 in which the AMA is transmitted at a first predetermined segment of the media content. In one example, this first predetermined segment may be at or near the half-way point of the media content program, which indicates that the viewer tuned to the content no later than this half-way point (or other predetermined segment). In this embodiment, nothing is displayed to the viewer upon receipt of the AMA at the CPE. The CPE is sent at this time only to provide a means to identify that the viewer tuned to the media content no later than the first predetermined segment. It is appreciated that, according to other embodiments, the first predetermined segment may be at any other portion of the media content program that would allow identifying that the viewer tuned to the media content for at least the minimum threshold amount of time (e.g., at or near the beginning of the program, with three-fourths of the program remaining, with one-fourth of the program remaining, with one hour of the program remaining, with thirty minutes of the program remaining, with fifteen minutes of the program remaining, a predefined percentage watched, a predefined percentage remaining, etc.). The minimum threshold amount of time may be defined according to any number of preferences, such as may be defined by a ratings system 106 (e.g., an external ratings system may dictate the portion of a program to be classified as having been viewed, etc.), by the network operator system 102, by a content provider system 104, or any other entity or operator having an interest in defining the audience participation and measurement parameters.

Following block 405 is block 410, in which the one or more inquiries that are provided by the AMA are caused to be displayed at a second predetermined segment, which is later in the media content programming than the first segment by at least a predetermined minimum amount of programming. For example, in one embodiment, this second predetermined segment may be at or near the end of the media content program (e.g., before or during credits, after credits, during a last commercial segment, during network advertising or messages, etc.). Thus, the amount of separation between the first predetermined segment at block 405 and the second predetermined segment at block 410 can be set based on the minimum threshold for classifying media content as having been viewed. The method 400 may end after block 410, having generated the one or more inquiries, which are described in more detail with reference to FIG. 3.

FIG. 5 provides a flow diagram depicting a different example method for determining whether a minimum threshold of the media content has been viewed, according to one embodiment. According to this embodiment, an AMA includes a timer function that tracks the amount of time the associated media content was displayed. The method 500 may begin at block 505, in which the AMA that is received by the viewer's CPE, such as at block 310 of FIG. 3, includes a timer function. At block 510, the timer function of the AMA can be initiated upon receipt of the AMA to begin logging or otherwise tracking the time during which the media content is displayed, wherein the AMA is delivered to the viewer's CPE at or near the same time the media content was first tuned (in contrast to some predetermined time from the end of the media content, as per the previous example).

According to some embodiments, the AMA may optionally be programmed to stop the timer at block 515 when the media content to which the AMA is associated is no longer being displayed, such as upon changing channels or delivering different content, or powering off the television 124 or the set-top box 122. Likewise, at block 520, the AMA may optionally be programmed to reinitiate the timer when the AMA to which the media content is associated is re-displayed, such as upon recalling the channel and/or powering on the television 124 or set-top box 122.

For example, according to one embodiment, the timer may be a separate interactive television application from the AMA, or that is executed separately by the AMA (e.g., an application call to a separate interactive television application), which may not be bound to the media content and persist locally on the viewer's CPE, at least for the duration until the one or more inquiries are presented or the media content is terminated. One or more unique identifiers can be provided by the AMA to the separate time or other interactive television application that identifies the media content and the instance of the AMA, allowing for continuity in measurement and viewer activity tracking, irrespective of whether the viewer has retuned or otherwise navigated away from and back to the media content. Thus, in this embodiment, the timer function may run or otherwise continue to track or store the elapsed time displayed, even when the media content is no longer being displayed and the AMA is bound to the media content (e.g., such as if a different instance of the AMA is re-transmitted when the media content is retuned). It is appreciated that a timer or other tracking function may similarly be provided or otherwise executed in the method described with reference to FIG. 4, which includes programming logic that programmatically tracks that a viewer has navigated to and away from the media content, particularly when the AMA is bound to the media content.

Therefore, the timer function according to this embodiment allows tracking the elapsed time during which the media content was actually being displayed from the set-top box 122. It is appreciated, however, that in other embodiments, once the timer is initiated, it may not be stopped and/or restarted when tuning to different content, but instead may indicate the total time between when the media content was first tuned (e.g., when the AMA was first received and executed at the viewer's CPE) until the one or more inquiries (at block 525) are displayed. Moreover, it is further appreciated that multiple AMAs and timer functions can be running concurrently for different media content programs in the same or similar manner as described, such as to track a viewer who is actively viewing multiple programs concurrently, retuning between the programs.

Accordingly, at block 525, the AMA causes the one or more inquiries to be displayed to the viewer at a predetermined segment of the media content program. In one example, the AMA may cause display of the inquiry at or near the end of the media content (e.g., before or during credits, after credits, during a last commercial segment, during network advertising or messages, etc.). Thus, the viewer's responses can be gathered assuming the viewer stayed tuned to the media content until the end. However, in other embodiments, the AMA may cause display of an inquiry at some other portion of the media content. For example, in one embodiment, the AMA may be programmed to display an inquiry requesting the viewer's response immediately upon detecting that the timer has run for a minimum threshold period of time (e.g., after a predetermined number of minutes, after a predetermined percentage of the overall program has been viewed, etc.). In this manner, response information can still be collected from a viewer who tunes to a significant portion of the media content, but not to the very end.

Following block 525 is block 530, in which the total time during which the media content was displayed by the viewer's CPE is calculated or otherwise determined. In some embodiments, the total time the media content was displayed can be transmitted with the response information (e.g., at blocks 330 or 335 of FIG. 3) to the network operator system 102 for use in compiling audience participation data. Because the viewer's CPE or any associated programming cannot determine whether the viewer was in fact viewing the content, the time during which the CPE displays the content may serve as the best approximation, assuming that the viewer was in fact viewing the media content while it was being displayed. The indication of whether a response was provided by the viewer to the one or more inquiries, combined with the total viewing time, provides evidence of whether the viewer was in fact viewing the media content and can be utilized to track, analyze, and store the total time the content was displayed (and viewed).

It is appreciated that, at block 525, the total time during which the media content was displayed may be represented using a number of measurements, including an elapsed time period, a percentage of the entire media content program, a number of segments viewed, one or more time periods that together represent the total time viewed, and the like. The network operator system 102 may thus generate various different measurements depending upon the representation of the total time displayed. For example, an elapsed time displayed or a percentage of the entire media content may allow the network operator system to first identify whether at least a minimum threshold amount of the media content was viewed and then exactly what overall percentage of the media content was viewed. An overall percentage may be useful to content providers to gain an understanding of exactly how long on average viewers are tuning to their programs, such as to determine whether the total length of content may need to be adjusted. As another example, indicating which segments of the entire media content (e.g., if the media content is subdivided into predefined segments, etc.) or the exact time periods during which the media content was viewed, may enable the network operator system to identify exactly where the media content program viewership was lost or what segments had the highest amount of viewership. It is appreciated that the aforementioned examples are provided for illustrative purposes, and that any number of audience participation measurements can be generated according to various other embodiments.

The method 500 may end after block 530, having tracked the total time during which media content was displayed in addition to displaying one or more inquiries for capturing viewer response(s) to AMA-generated inquiries. Accordingly, the methods 400, 500 of FIGS. 4 and 5, respectively, provide at least two different programming configurations of an AMA to capture viewer response and/or feedback while also indicating that at least a minimum amount of the media content was displayed by the viewer's CPE, allowing the network operator system 102 to determine whether the viewer should be tracked as having viewed or not viewed the media content presented, such as is described in more detail with reference to FIG. 3.

With continued reference to FIG. 3, after having executed the AMA at block 315, such as according to the example embodiments described with reference to FIGS. 4-5, the method 300 continues to block 320. At block 320, the AMA causes one or more inquiries to be displayed to the viewer to allow identifying whether the viewer is actually watching what is being displayed or whether the viewer has turned his/her attention elsewhere or is no longer viewing the media content. The operations at block 320 are also described separately at blocks 410 and 525 of FIGS. 4, 5, respectively, with respect to the different embodiments described. For example, as described in some embodiments, an inquiry may be displayed at or near the end of the media content, such as if the AMA were transmitted at some point near the middle (or at some other predetermined segment of the program). As described in another example, an inquiry may be displayed after the media content has been displayed for at least a minimum threshold time, which need not be at or near the end of the media content, such as when utilizing a timer function of the AMA to track the time displayed.

An AMA may be programmed to generate an inquiry to simply detect whether the viewer is in fact viewing what is being displayed. A viewer may provide his/her response using a remote control 126. For example, the inquiry may present a single "button" or other selection required by the viewer (e.g., "Press OK if you are still viewing the program," etc.) or present a simple yes or no question (e.g., "Did you enjoy this program?", "Add to your favorites?", or "Are you still viewing this program?", etc.). In other embodiments, an AMA may be programmed to request more detailed feedback from the viewers, such as to receive their subjective opinions of the media content. For example, the inquiry may present a request for a user to provide a rating or indicate on a scale his/her opinion of the media content viewed (e.g., "How many stars would you rate this program?", "How many thumbs up or thumbs down would you give this program?", "Please rate this program on a scale of 1-5", "Please rate this program on a scale of 1-10", etc.). It is appreciated that additional response data can be collected from the viewer, such as requiring the viewer to input text (e.g., using a keyboard, remote keys, or selecting from an on-screen keyboard, etc.). At the least, a viewer providing a response to the inquiry at block 320 will indicate that the viewer was in fact viewing the media content at the time the inquiries were displayed. However, in embodiments which request additional feedback responses from the viewer, the viewer's rating and/or other subjective opinion of the media content can be utilized to provide more detailed audience participation metrics, as well as to provide a more intelligent media recommendation based on the viewer's express preferences.

Accordingly, following block 320 is decision block 325, in which it is determined whether viewer responses to the inquiries at block 320 were received. If a response from the viewer was received, which indicates at least that the viewer was viewing the media content at the time of the inquiry, then the method proceeds to block 330 for transmitting response information to the network operator system. If, however, no response from the viewer was received (e.g., the operation timed out waiting for a viewer response, etc.), then operations proceed to block 335 to transmit an indication that the viewer did not respond to the inquiry.

At block 330, if the viewer responded, the AMA may be programmed to generate a response message for upstream transmitting over the distribution network 110. Like the technique utilized to deliver the AMA to the viewer's CPE, the AMA may configure the response message for transmission in-band or out-of-band from the viewer's CPE (e.g., from a set-top box 122, etc.).

According to various embodiments, the response information transmitted at block 330 may include a variety of data, depending upon the AMA programming and desired implementation. For example, in one embodiment, the response information may simply include an indication that the viewer did respond or an indication that the viewer was viewing the media content at that time. In another example, the response information may additionally (or instead) include an indication of the actual response provided by the viewer when the inquiries requested a specific response (e.g., feedback, such as "yes," "no," x out of y stars, etc.). Moreover, according to some embodiments, an AMA may be programmed to retrieve locally stored information, such as, but not limited to, information identifying the CPE (e.g., MAC address or other unique identifier, etc.), information identifying the media content (e.g., information extracted from digital programming guide data, etc.), information identifying the date and/or time of day, private information associated with a viewer's account, if the viewer provides permission (e.g., zip code or other info to associate the viewer with a specific designated market area), type of set-top box (e.g., basic equipment or advanced equipment, such as with an integrated digital video recorder, etc.), the viewer's subscription information (e.g., basic cable, bundled package with multiple premium stations, etc.), or whether the viewer is viewing the media content live or time shifted, and optionally by how much, and the like.

If it is determined at decision block 325 that the viewer did not respond to the one or more inquiries presented, then block 335 is performed. According to one embodiment, the AMA may be programmed to wait a predetermined amount of time for a response to be received at the CPE, after which it will time out, indicating that the viewer was not viewing the content. Therefore, at block 335, the AMA is programmed to transmit an indication that the viewer did not respond or that the media content was not viewed at the time the one or more inquiries were displayed. The response information transmitted at block 335 (e.g., that no response was received) may optionally include any of the additional information described with reference to block 330, such as, but not limited to, information identifying the CPE, information identifying the media content, information identifying the date and/or time of day, and the like.

The method 300 may thus end after blocks 330 or 335, having executed the AMA at the viewer's CPE and collected the response information, if any, for transmittal over the distribution network to the network operator system.

Figure 6:
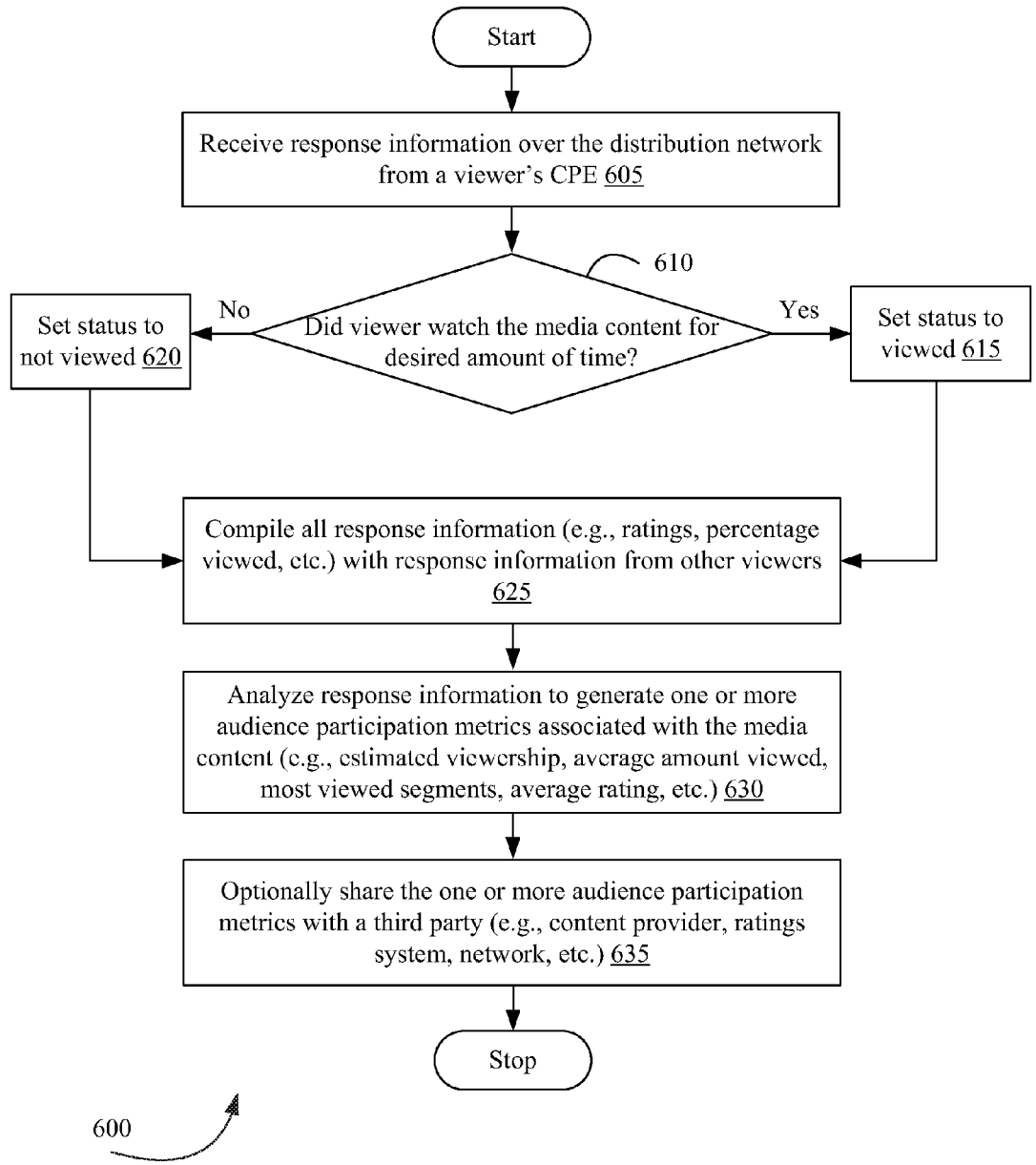
FIG. 6 is a flow diagram depicting an example method for capturing and analyzing audience participation information received from consumer premise equipment, according to an example embodiment.

Upon receiving the response information (or any other indication from the viewer's CPE generated from an AMA corresponding to media content), the network operator system 102 may analyze the received response information for use in generating audience participation data. Accordingly, FIG. 6 provides a flow diagram depicting an example method for capturing and analyzing audience participation information received from a viewer's CPE, according to an example embodiment. In one embodiment, the method 600 is performed by a network operator system 102, such as by a content distribution module 150 and/or an audience measurement module 152, as described with reference to FIG. 1.

The method 600 may begin at block 605, where response information is received over the distribution network 110 from a viewer's CPE, such as would be transmitted at blocks 330 or 335 of FIG. 3. Following block 605 is decision block 610, in which the network operator system 102 determines whether or not the viewer watched the media content for the desired minimum amount of time in order to classify the viewer as having viewed the media content. The determination at decision block 610 depends, in part, on the embodiment and the AMA programming utilized to detect whether the program has been displayed for a minimum amount of time and whether the viewer was in fact watching. For example, two embodiments described with reference to FIGS. 4-5 provide examples of determining whether the program has been viewed for a minimum amount of time, such as separating the delivery of the AMA and the display of the inquiries and/or utilizing a timer function. Accordingly, depending upon the data received at block 605, and the configuration and technique associated with the AMA, the network operator system 102 can determine whether or not the viewer viewed the media content.

For example, if the AMA was delivered at a predetermined segment prior to the display of the one or more inquiries, such as in the embodiment described with reference to FIG. 4, and if an indication that the viewer did respond to an inquiry at or near the end of the media content program (or at any other predetermined segment occurring after the AMA was delivered), the network operator system 102 may conclude that the minimum amount of the media content was viewed and set the status accordingly at block 615 (e.g., "viewed"). Similarly, if the response data received at block 605 includes an elapsed time of viewing that exceeds a minimum threshold amount of time, the network operator system 102 may conclude that the minimum amount of the media content was viewed and set the status accordingly at block 615. In another example, the network operator system 102 may analyze both elapsed time data and an indication of whether a response was received from the viewer in order to set the status as "viewed" at block 615 if both the time meets or exceeds the minimum threshold amount of time and the viewer responded to the inquiry.

Otherwise, if the viewer did not respond to any of the inquiries, it may be determined that the viewer did not view the media content for the minimum threshold amount of time, and thus the status is set to "not viewed" at block 620. Or, in another embodiment, if timer data received at block 605 indicates that less than a minimum threshold amount of the media content was displayed, the status is set to "not viewed" at block 620.

Block 625 follows, in which all response information received from one viewer is compiled with response information from other viewers for the same media content to allow performing viewership population analyses and generating audience participation metrics at block 630. For example, the network operator system 102 may track the total number of viewers that watched at least a minimum amount of the media content to generate audience participation metrics, such as a popularity or viewership metric (e.g., a percentage of all active households or all active CPEs watching the media content, a sorted list of popularity by viewership, number of viewers that timed-out or did not respond to the inquiries, etc.). Other subjective feedback data and/or amount of time, segments watched, etc., may also be compiled to provide ratings and trends across a population of viewers for the media content. For example, audience participation metrics may include, but are not limited to, average ratings or average opinion of the media content across a population of viewers, number of viewers at each point on a multi-point scale, most watched segment of the media content, least watched segment of the media content, segment of the media content having the greatest number of exits or channel changes, average percentage of the media content viewed, average time of the media content viewed, correlation of rating to time viewed, average rating or time viewed to format presented (e.g., standard definition, high definition, etc.), average rating or time viewed of live content compared to recorded content (e.g., to indicate whether viewers who record a media content rate the content higher or lower, or viewed more or less of the content, etc.), rating or time viewed compared to account type (e.g., to indicate whether someone who has more channel choices rate media content differently from those with fewer channel choices, or view more or less of the content, etc.), average rating or time viewed based on location (e.g., using account's zip code, city, state, etc.), and the like.

Block 635 optionally follows block 630, in one embodiment, in which the audience participation metrics may optionally be shared with one or more third parties, such as, but not limited to, one or more ratings systems 106 or one or more content provider systems 104.

The method 600 may end after block 635, having compiled and analyzed viewer response information and generating audience participation data.

Figure 7:
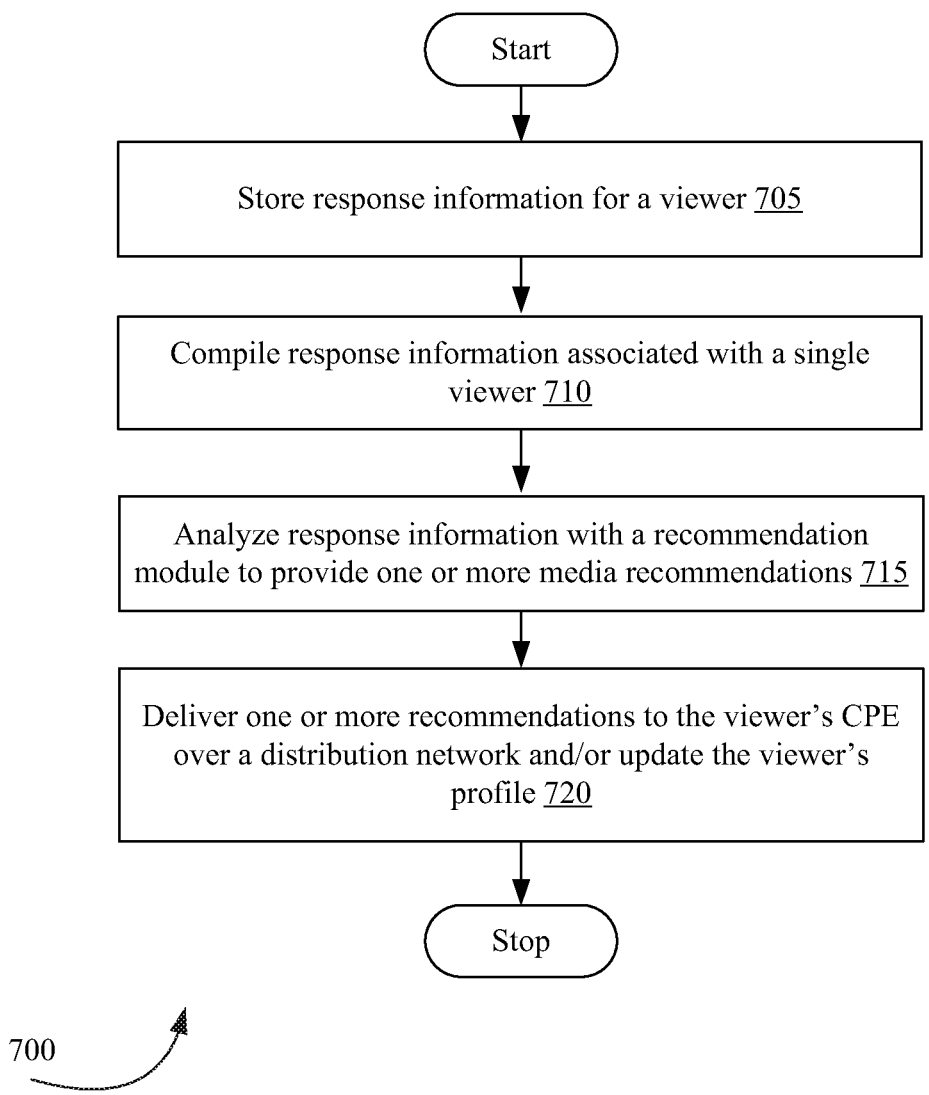
FIG. 7 is a flow diagram depicting an example method for generating media recommendations based on audience participation information, according to an example embodiment.

FIG. 7 provides a flow diagram depicting an example method for generating media recommendations based on audience participation information, according to an example embodiment. For example, in addition to, or instead of, generating audience participation metrics based on compiled response information from a number of viewers, one or more media recommendations, such as recommended programming, may be generated for a viewer based on that specific viewer's response information received. The method 700 may also be performed by a network operator system 102, such as by a content distribution module 150 and/or a recommendation module 154, as described with reference to FIG. 1.

The method 700 may begin at block 705, where response information received from a viewer, such as is described with reference to FIG. 3, is stored by the network operator system 102. In one embodiment, the network operator system 102 may maintain a viewer profile for each viewer (or at least for a subset of viewers) in memory to allow identifying viewer preferences and tracking viewer habits. Viewer profile information may be stored in one or more data storage devices associated with the network operator system 102, such as a local or remote database, allowing access and retrieval therefrom. Following block 705 is block 710, in which the response information for a single viewer gathered over time may be compiled for subsequent recommendation analysis. It is appreciated that, in some embodiments, not all of the historical response information stored in memory may be compiled, but only a subset thereof. In yet other embodiments, media content recommendations may be based on only a single response, and multiple responses are thus not compiled or analyzed.

Having compiled all, or a subset of, the response information for a viewer, the network operator system 102 may then analyze the compiled response information at block 715 to generate one or more media content recommendations. In one embodiment, the network operator system 102 includes a recommendation module 154 that includes programming instructions for comparing the viewer's response data and/or subjective feedback of media content preferences to other media content available for delivery to the viewer to identify other recommended content. Numerous recommendation engine techniques, such as are known, can be utilized to identify the recommended content. For example, in one embodiment, the network operator system 102 may be configured to categorize the viewer-rated media content (which may be performed by the network operator system, a content provider, a ratings system, or another third-party system) and to compare the preferred content to similarly categorized content to identify recommendations. In another embodiment, the network operator system 102 may be configured to statistically compare the viewer's preferences to viewing habits of other viewers having similar preferences to identify recommended media content (e.g., similar to features that identify that "others who enjoy this program also enjoy . . . ", etc.). It is appreciated that a number of recommendation engine techniques are available and that the aforementioned examples are provided for illustrative purposes and are not intended to be limiting. Moreover, in some embodiments, recommendation operations may be performed, at least in part, by a third party, whereby the network operator system 102 shares the viewer's responses and/or other preference or viewing history information, and the third party responds with one or more recommendations.

Following block 715 is block 720, in which one or more recommendations are provided for the viewer. In one embodiment, the recommendations may be delivered to the viewer's CPE over the distribution network, such as by presenting a list of available media content (e.g., non-linear on-demand content, etc.) or a schedule of future programming (e.g., linear programming) that satisfies the recommendations generated at block 715. In another embodiment, the one or more recommendations may be stored or otherwise associated with the viewer's profile, which may be accessed at a subsequent time to provide recommendations or accessed and updated by the viewer, such as to customize or alter the recommendations and viewer preferences. According to various embodiments, recommendations may refer to media content currently available (e.g., linear content currently being broadcast), media content schedule for broadcast at some future date (e.g., indicating a channel and one or more time slots when the content will be broadcast), non-linear content immediately available or available at some point in the future (e.g., on-demand content, etc.), and the like.

According to yet another embodiment, in association with the operations at block 720, the network operator system may generate and deliver one or more additional interactive television applications (e.g., EBIF application, etc.) that would cause the one or more recommended programs to be recorded in memory (e.g., by a digital video recorder, etc.) of the viewer's set-top box 122 or other CPE. For example, the CPE menu may include a recommended programming section that includes all automatically stored media content based on these recommendations. In another similar embodiment, instead of automatically recording the recommended media content, an interactive television application may be programmed to simply initiate a pop-up or other reminder regarding the recommendation, notifying the viewer of the recommendation and allowing the viewer to request the content as desired. Reminders may be configured in a number of ways, including, but not limited to, reminding the viewer when recommended content is beginning (e.g., linear broadcast content), notifying the viewer that recommendations are available and providing options to display and select the recommended content, reminding the viewer to access a recommended programming menu to view stored recommendations, and the like.

The method 700 may end after block 720, having analyzed a viewer's response data and generating one or more recommendations based at least partially on the viewer's responses.

Accordingly, embodiments of the systems and methods described herein allow beneficially monitoring and capturing viewer participation data utilizing the distribution network, without requiring additional hardware or use of multiple networks or other communications means. Moreover, by utilizing the capabilities and flexibility of interactive television application programming, a network operator system may more easily identify how long a viewer watched media content (or at least how long it was displayed) and seek feedback at one or more points during the programming to provide a better measurement of whether the viewer was in fact viewing the content or was simply tuned in but not watching. In addition, the interactive television application programming provides a simple means for collecting viewers' subjective feedback and media content ratings by presenting inquiries and receiving the viewers' express opinions. Thus, whereas conventional audience measurement technologies are limited to what and how long content was tuned to, these systems and methods allow collecting subjective feedback data from the viewers. This subjective feedback data may advantageously be utilized to generate more meaningful viewership metrics, which has value to ratings systems, content providers, networks, network operators, and even the viewers themselves by generating recommendations and tailored programming based on their explicit feedback while watching media content.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for measuring audience participation, comprising:
    delivering media content to a consumer premise equipment (CPE) over a distribution network associated with a user account;
    delivering an audience measurement application associated with the media content over the distribution network, wherein the audience measurement application is configured for execution by the CPE, and wherein the audience measurement application is programmed to generate at least one inquiry for display to one or more viewers in association with viewing the media content and to request at least one response by the one or more viewers to be entered via the CPE;
    receiving, from the one or more viewers, response information associated with the at least one response to the at least one inquiry from the CPE over the distribution network; and
    determining a participation level associated with the media content for each of the one or more viewers based at least in part on the response information received from the CPE, wherein the participation level includes a minimum length of time viewing the media content, a measurement to be used to calculate a number of viewers associated with the media content, and one or more ratings associated with the media content;
    wherein the audience measurement application is programmed to execute a timer at a first time during display of the media content, to generate the at least one inquiry for display after a predetermined time has elapsed, to pause the timer when the media content is not being displayed, and to continue the timer when the media content is displayed again.

2. The method of claim 1, wherein the audience measurement application is an enhanced binary interchange format (EBIF) application.

3. The method of claim 1, wherein the audience measurement application is transmitted over the distribution network in-band or out-of-band with respect to the media content.

4. The method of claim 1, wherein the media content is an individual television program having a beginning and an end.

5. The method of claim 1, wherein the audience measurement application is programmed to generate the at least one inquiry at a predetermined segment of the media content.

6. The method of claim 1, wherein the audience measurement application is delivered to the CPE at a first segment of the media content and programmed to generate the at least one inquiry for display at a second segment of the media content subsequent to the first segment of the media content, wherein the time between the first segment and the second segment is selected to represent an amount of the media content at or above a threshold level of participation.

7. The method of claim 1, wherein the audience measurement application is programmed to track a relative amount of the media content being displayed by the CPE.

8. The method of claim 1, wherein the at least one inquiry includes a request for feedback about the media content.

9. The method of claim 1, wherein determining the participation level for each of the one or more viewers includes determining whether each viewer viewed an amount of the media content at or above a threshold level.

10. The method of claim 9, wherein determining whether each viewer viewed an amount of the media content at or above the threshold level is based on whether the response information received from the CPE indicates that each viewer provided a response,
    wherein, if each viewer did provide a response, it is determined that each viewer viewed an amount of the media content at or above the threshold level, and
    wherein, if each viewer did not provide a response, it is determined that each viewer did not view an amount of the media content at or above the threshold level.

11. The method of claim 9, wherein the response information includes a relative amount of the media content displayed by the CPE, and wherein determining whether each of the one or more viewers viewed an amount of the media content at or above the threshold level is based at least in part on the relative amount of the media content displayed by the CPE included with the response information.

12. The method of claim 1, wherein delivering the media content to a CPE over the distribution network comprises delivering the media content to a plurality of CPEs associated with a plurality of user accounts over the distribution network, and wherein the response information is received from the plurality of CPEs.

13. The method of claim 12, further comprising analyzing the response information received from the plurality of CPEs to generate at least one audience measurement metric associated with the media content.

14. The method of claim 13, wherein the at least one audience measurement metric includes at least one of: (a) an estimated viewership level; (b) an average amount of the media content viewed; (c) an indication of one or more segments of the media content having a viewership level at or above a threshold value; or (d) an average viewer rating value.

15. The method of claim 13, further comprising transmitting the at least one audience measurement metric over a network to at least one of: (a) at least one content provider system; (b) at least one ratings system.

16. The method of claim 1, further comprising generating at least one media content recommendation for each viewer based at least in part on the response information received from the CPE and on stored recommendation data.

17. The method of claim 1, wherein the response information includes programming guide data retrieved by the audience measurement application from the CPE.

18. A non-transitory computer-readable medium comprising computer program instructions providing an audience measurement application for delivery over a distribution network to a consumer premise equipment (CPE), which, when executed by the CPE, the CPE is caused to:
    display to one or more viewers at least one inquiry after a predetermined amount of the media content has been displayed by the CPE;
    receive at least one response from the one or more viewers to the at least one inquiry; and
    transmit response information associated with the at least one response from the CPE over the distribution network to a network operator system, wherein the response information enables evaluation by the network operator system to determine a participation level associated with the media content for each of the one or more viewers, wherein the participation level includes a minimum length of time viewing the media content, a measurement to be used to calculate a number of viewers associated with the media content, and one or more ratings associated with the media content;
    wherein the audience measurement application is programmed to execute a timer at a first time during display of the media content, to generate the at least one inquiry for display after a predetermined time has elapsed, to pause the timer when the media content is not being displayed, and to continue the timer when the media content is displayed again.

19. A system for measuring audience participation, comprising:
    a network operator system comprising one or more computers, storing computer-executable instructions, and in communication with a distribution network, wherein the network operator system is operable to execute the computer-executable instructions to:
        deliver media content to a consumer premise equipment (CPE) over the distribution network;
        deliver an audience measurement application associated with the media content over the distribution network, wherein the audience measurement application is configured for execution by the CPE, and wherein the audience measurement application is programmed to generate at least one inquiry for display to one or more viewers in association with viewing the media content and to request at least one response by the one or more viewers to be entered via the CPE;
        receive, from the one or more viewers, response information associated with the at least one response to the at least one inquiry from the CPE over the distribution network; and
        determine a participation level associated with the media content for each of the one or more viewers based at least in part on the response information received from the CPE, wherein the participation level includes a minimum length of time viewing the media content, a measurement to be used to calculate a number of viewers associated with the media content, and one or more ratings associated with the media content;
        wherein the audience measurement application is programmed to execute a timer at a first time during display of the media content, to generate the at least one inquiry for display after a predetermined time has elapsed, to pause the timer when the media content is not being displayed, and to continue the timer when the media content is displayed again.

* * * * *